United States Patent [19]
Boudreau et al.

[11] Patent Number: 6,036,472
[45] Date of Patent: Mar. 14, 2000

[54] EJECTION METHODS AND LINKAGE APPARATUS FOR STACK MOLDS

[75] Inventors: Paul R Boudreau, Fitchburg, Mass.; Gary W Higgins, Anaheim Hills, Calif.

[73] Assignee: Husky Injection Molding Systems Ltd., Canada

[21] Appl. No.: 09/183,440

[22] Filed: Oct. 30, 1998

Related U.S. Application Data

[62] Division of application No. 08/844,049, Apr. 18, 1997, Pat. No. 5,908,597.

[51] Int. Cl.$^7$ .................................................. B29C 45/40
[52] U.S. Cl. ...................... 425/556; 425/436 R; 425/438; 425/444; 425/588
[58] Field of Search ............................... 425/338, 436 R, 425/438, 441, 444, 451.3, 556, 588, 589

[56] References Cited

U.S. PATENT DOCUMENTS

| | | | |
|---|---|---|---|
| 2,331,015 | 10/1943 | Dawes et al. . | |
| 3,659,997 | 5/1972 | Rees . | |
| 3,767,352 | 10/1973 | Rees ........................................ | 425/441 |
| 4,025,268 | 5/1977 | Taylor ..................................... | 425/588 |
| 4,154,566 | 5/1979 | Ward ................................... | 425/451.3 |
| 4,207,051 | 6/1980 | Wright et al. ............................. | 425/556 |
| 4,408,981 | 10/1983 | Brown ..................................... | 425/589 |
| 4,589,840 | 5/1986 | Schad ...................................... | 425/556 |
| 4,718,845 | 1/1988 | Sheffield et al. ......................... | 425/589 |
| 4,752,200 | 6/1988 | Bartschke ................................ | 425/139 |
| 4,929,166 | 5/1990 | DiSimone et al. ....................... | 425/190 |
| 4,994,228 | 2/1991 | Watanabe ................................ | 264/335 |
| 5,037,597 | 8/1991 | McGinley et al. ....................... | 425/588 |
| 5,104,308 | 4/1992 | Morton et al. ........................... | 425/589 |
| 5,112,558 | 5/1992 | Schad et al. .......................... | 264/297.2 |
| 5,578,333 | 11/1996 | Schad et al. ............................. | 425/588 |
| 5,681,595 | 10/1997 | Travaglini ................................ | 425/444 |
| 5,707,666 | 1/1998 | DiSimone et al. ....................... | 425/588 |
| 5,731,014 | 3/1998 | Travaglini ................................ | 425/556 |

*Primary Examiner*—James P. Mackey
*Attorney, Agent, or Firm*—Bachman & LaPointe, P.C.

[57] ABSTRACT

A molded article ejection device for use in conjunction with a multistation molding machine. The multistation molding machine has at least a first molding station defined between a first mold platen and a second mold platen and a second molding station defined between the second mold platen and a third mold platen, a mechanism for opening and closing the molding stations, and tie bars for connecting the first, second and third mold platens. Ejection devices are used for ejecting molded articles from each of the first and second molding stations and a linkage is used for connecting a plurality of the ejection devices and translating movement of at least one ejection device to at least one other ejection device. A motive mechanism is used for actuating the ejection devices, wherein the motive mechanism is independent of the mechanism for opening and closing.

34 Claims, 11 Drawing Sheets

EJECTION METHODS AND LINKAGE APPARATUS FOR STACK MOLDS

This is a Division, of application Ser. No. 08/844,049, filed Apr. 18, 1997, now U.S. Pat. No. 5,908,597.

BACKGROUND OF THE INVENTION

This invention is directed to ejection devices and methods for stripping or demolding articles from multistation molding machines. More particularly, this invention teaches an innovative linking mechanism, between the ejection means of each molding station of a stack mold, which is independent relative to the motive means and linkage mechanism used to open/close the mold stations of a stack mold.

Generally speaking, a molded article may be ejected from a mold using mechanical means, such as stripper plates or stripping pins, or non-mechanical means, such as pressurized air. The mechanical ejection means are actuated using various motive means that are either part of the mold or part of the molding machine. All these ejection and motive means have been successfully used in conjunction with a single face (one station) type of mold.

Ejection of molded articles from a multistation mold can be achieved using the same means as mentioned for single face molds. Unfortunately, this approach does not represent an optimum solution taking into account the number of components that have to be used to serve each molding station. Based on the injection sequence within each molding station of a multistation mold, multistation molds can be used for either sequential or simultaneous injection processes. In a sequential process, at a certain time one station is used for a different molding step than the other(s). For example, in station A, one article may be in the cavity undergoing a cooling process, while in station B an article can be either ejected (if it has been in a cooling step prior this step) or an article can be injected in an empty cavity (if an article has been ejected before from this station). Accordingly, in a sequential process, a molding station can be in the open position (for ejection) while another molding station is in a closed position (for injection or cooling). This type of mold is sometimes known as a tandem mold. A tandem mold is useful when injecting large articles that have to remain in the closed mold to be cooled before being ejected. It thus appears that the only way to eject articles during a sequential process carried on using a multistation mold is by using any ejection means suitable for one face molds.

In most molding applications where the plastic articles are relatively small and do not require a long cooling time in the mold, a simultaneous injection process is carried on using a so called stack mold. In a stack mold, articles are injected, cooled and ejected simultaneously in a plurality of molding stations that are located between the fixed and the movable platen of a molding machine. Therefore, in a stack mold all stations are either open or closed simultaneously. Ejection of the molded articles from a stack mold can be done by using any ejection means suitable for one face molds. Nevertheless, this is not an optimum approach taking into account that each station must then have individual ejection and motive means. Slight improvements of the ejection methods used in conjunction with a stack mold have been already disclosed, wherein the ejection means and the opening means of the stack mold have been connected by a linking mechanism, as a means to use a single motive means to perform simultaneous opening of the stack mold and ejection of articles from all stations. This approach has two major drawbacks. First, the ejection step must follow immediately the opening of the mold, thus no window time is provided to extend the cooling of the part in the mold. Second, the common linking mechanism makes the access of a robotics arm more difficult due to the lack of space in-between the mold stations.

It is thus the main purpose of this invention to teach a novel linking mechanism among the mechanical ejection means of a plurality of molds that is independent to stack mold's linking and motive means. The linking mechanical among the ejection means may be actuated by various motive means that are either part of the mold or of the molding machine.

The patent literature teaches various ejection methods using numerous ejection means in conjunction with several actuation methods and means. For example, mechanically actuated ejection means using such devices as various knock-out rods is disclosed in U.S. Pat. No. 3,448,488 to Kiraly. Hydraulically actuated ejection means are disclosed in U.S. Pat. No. 4,752,200 to Bartschke. Using pressurized fluid, such as blown air, is another ejection method which is simpler than most mechanical methods for pushing a molded part off or out of a mold core and cavity respectively. Such a method and means is disclosed in U.S. Pat. No. 4,994,228 to Watanabe. All of these ejection methods and means are disclosed for use in conjunction with standard molds having a single molding station, i.e., one cavity plate and one core plate. While many of these methods and means may be successfully used in connection with multistation molds, such as stack molds, they represent expensive and complicated solutions since based on their design, each molding station is required to have its own independently driven and actuated ejection means.

Multistation molds such as stack molds have been in use for many decades and are also well described in the patent literature as a very productive tool for efficiently molding a large quantity of articles. A stack mold generally includes at least two separate molding stations consisting of at least one pair of cavity/core combinations. In many cases, multiple cavity/core combinations are used. During use, stack mold stations are typically all simultaneously closed, fed with molten resin, and then opened and automatically demolded using the necessary means to execute all of these steps. Because of the multiple stations, demolding or the ejection process of plastic articles from the multiple molding stations in stack molds represent a distinctive and substantially more complex issue in comparison to similar ejection steps performed in single station molds. The complexity stems from the fact that the multiple ejection mechanisms currently used in the stations of the stack molds have to be accurately coordinated among each other during the entire cycle time and especially during the opening sequence of each mold station. A variety of ejection methods and means for use with stack molds are disclosed in the prior art.

These methods and means include German Patent 2,243, 823 which teaches a stack mold wherein the plastic parts are air ejected via poppets; U.S. Pat. No. 2,331,015 which teaches a stack mold having a hydraulically actuated pair of pistons mounted on a center section used to open the molds at the mold parting lines; U.S. Pat. No. 3,767,352, assigned to the assignee of the present application, which teaches a linkage mechanism contained in mold shoes that is further connected to a stripper plate. The linkage mechanism causes the stripper plate to move as the stack mold opens for ejecting molded articles. The actual motion of the stripper plate is a simple harmonic motion and happens during the opening stroke of the mold; U.S. Pat. No. 4,207,051, also assigned to the assignee of the present application, which teaches a stack mold using a rack and pinion centering means that has a stripper plate driven by an adjustable link connected to a pinion mounted on a center section of the mold.

In accordance with these previously developed stack mold ejection methods and means, several drawbacks are apparent which thus far, have not been properly addressed.

Air ejection methods have limited applications since the size, shape and/or weight of the plastic parts must be suitable, and typically are not, for this simple and inexpensive method. In U.S. Pat. Nos. 3,767,352 and 4,207,051, the ejection means is directly connected to the motive means used to open and close the mold stations of the stack mold. This is a major disadvantage since space constraints caused by connecting the ejection and linkage means to the motive means prevent robotic means from entering the molding area to pick up parts that have been already ejected during the opening of the stations. In addition, independent opening of the stack mold without ejecting a part therefrom is not possible and the actual mold opening stroke is limited. Further, by using ejection means connected to the mold opening means, a cooling step which is generally required cannot be extended after opening the molding station since the parts will be ejected immediately.

Ejection means and methods which are totally independent of the mold parting means are taught in the patent and technical literature, but those taught are not economical solutions for stack molds since each molding station in these devices is required to have its own motive and actuation means.

There exists a need, therefore, for an ejection means and method that overcomes the drawbacks of the existing ejection methods and means described in the technical literature. In this regard, the present invention teaches an ejection method and means using innovative linkage means among stripping mechanisms of each molding station and appropriate motive means to actuate the linkage means, wherein both the linkage and the motive means are independent to the linkage and motive means operating the stack mold. At least one common unit is used for driving the ejection means of all of the stations of the stack mold.

SUMMARY OF THE INVENTION

The primary object of this invention is to provide an improved ejection means and method for use with multiple station or stack molds that are simpler and more efficient than currently taught ejection methods and means used for stack molds.

Another object of this invention is to provide an ejection means and method including motive and/or linkage means separate from the motive and linkage means used to open and close the stack mold.

Still another object of this invention is to provide an improved ejection means and method for ejecting articles from at least two molding stations of a stack mold, wherein ejection plates are used for each molding station and operate simultaneously being actuated by a single motive means, and also in a coordinated manner with respect to the stack mold's opening/closing.

Yet another object of this invention is to provide an improved ejection means and method for ejecting molded articles from at least two stations of a stack mold, wherein the ejection of the articles from all stations of the stack mold is timely independent with respect to the opening and closing steps of all molding stations of the stack mold.

Still another object of this invention is to provide an improved ejection means and method for ejecting articles from at least two molding stations of a stack mold, wherein ejection linkage means used for actuating the ejection of molded articles from at least two molding stations are physically independent relative to motive and linkage means used for opening and closing the stack mold and/or providing operations on other machine parts.

Yet another object of this invention is to provide an improved ejection means and method comprising linkage means driven by motive means positioned outside of the stack mold and unassociated with the motive means used for opening and closing the stack mold.

Another object of this invention is to provide an improved ejection means and method comprising linkage means driven by motive means positioned inside the stack mold, that are not physically associated with the motive means used for opening and closing the stack mold.

The disclosed objects and advantages are achieved by the molded article ejection device and method of the present invention for use in conjunction with a multistation molding machine.

The device comprises a multistation molding machine having at least a first molding station defined between a first mold platen and a second mold platen and a second molding station defined between the second mold platen and a third mold platen, a means for opening and closing the molding stations, and means for connecting the first, second and third mold platens; ejection means for ejecting molded articles from each of the first and second molding stations; linkage means for connecting a plurality of the ejection means and translating movement of at least one ejection means to at least one other ejection means; and motive means for actuating the ejection means, wherein the motive means is independent of the means for opening and closing the molding stations.

A method for ejecting molded articles from an injection molding machine in accordance with the present invention comprises the steps of providing a multistation molding machine having at least two molding stations defined between a first mold platen and a second mold platen and between said second mold platen and a third mold platen, and means for connecting said first, second and third mold platens; opening said at least two molding stations via a means for opening and closing after said articles are molded; actuating a first ejection means independent of said means for opening and closing; ejecting molded articles from a first one of said molding stations; translating actuation of said first ejection means to at least one other ejection means positioned in another one of said molding stations for actuating said at least one other ejection means; and further ejecting molded articles from said another one of said molding stations via said at least one other ejection means substantially simultaneously to said step of ejecting and independent of said motive mechanism.

The details of the present invention are set out in the following description and drawings wherein like reference characters depict like elements.

BRIEF DESCRIPTION OF THE DRAWINGS

FIG. 7 is a side elevational and partially cross sectional view of another embodiment of the injection molding machine and ejection mechanism in accordance with the principals of the present invention, wherein the motive means for opening and closing the stations of the stack mold comprises a harmonic linkage;

DETAILED DESCRIPTION OF THE PREFERRED EMBODIMENT(S)

Figure 1:
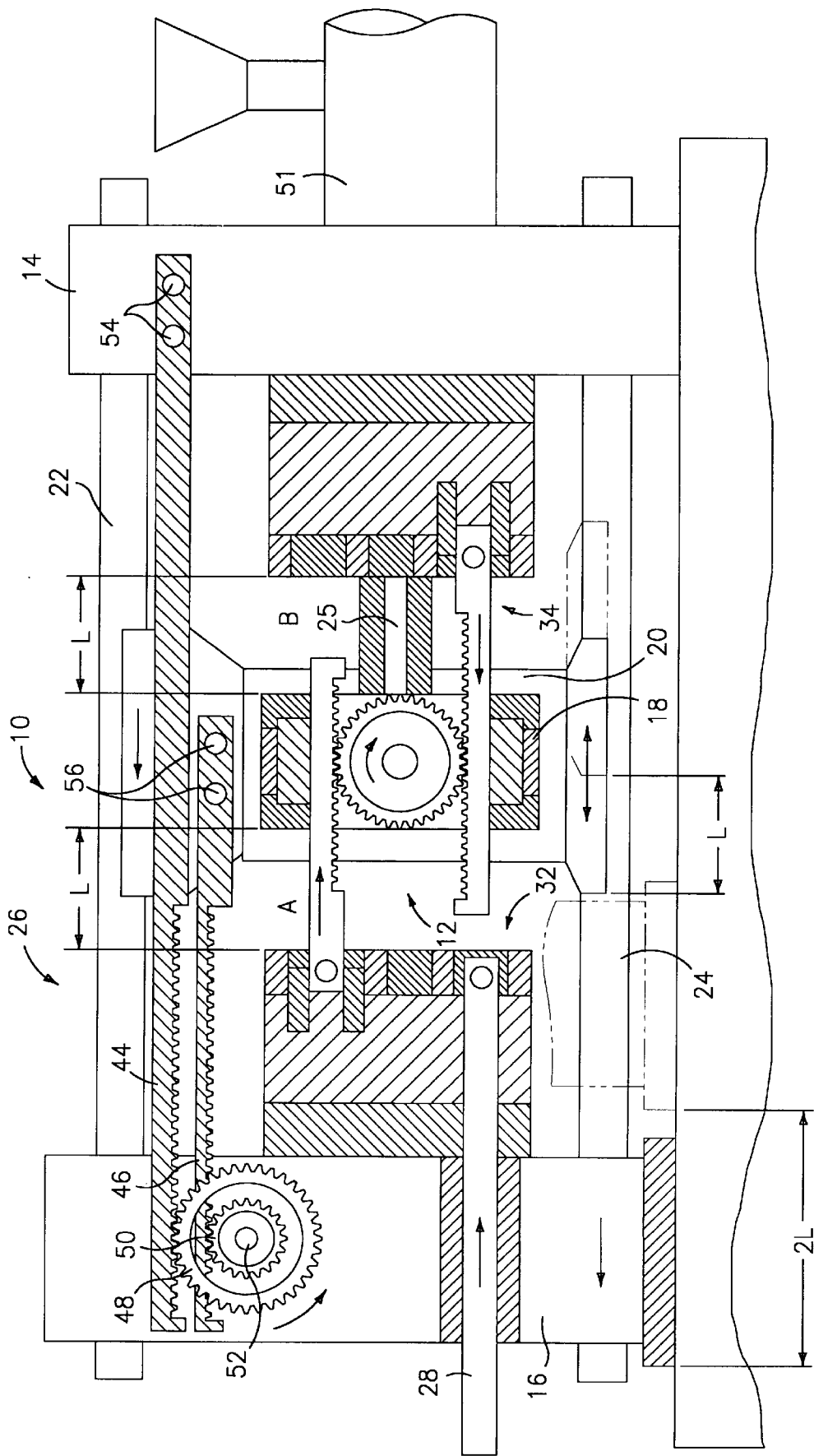
FIG. 1 is a side elevational and partially cross sectional view of an injection molding machine including a two station stack mold, an offset rack and pinion mechanical linkage for actuating the separation of the mold halves, and a molded part ejection mechanism using stripper plates in accordance with the principles of the present invention.

Referring now to the drawings in detail, there shown in FIG. 1 a molding machine 10 incorporating an ejection mechanism 12 of the present invention. Injection molding machine 10 generally includes a stationary platen 14, a movable platen 16 which in this embodiment is an end platen, and a central movable platen 18. Central movable platen 18 may be connected with a mold support member 20, wherein movable platen 16 and support member 20 are movable on upper tie bars 22 and lower tie bars 24. Injection molding machine 10 further generally includes an extruder 51 for feeding molten resin via sprue bar 25 into central platen 18 for use in molding articles in molding stations A and B. Finally, injection molding machine 10 also generally includes a motive mechanism 26 for opening and closing the two mold stations A & B. Ejection mechanism 12 generally includes a motive mechanism 28, a first molded part ejection device 32 for use in mold station A, and a linkage 33 to be described below for connecting the first ejection device 32 to a second ejection device 34 for use with mold station B.

Figure 2:
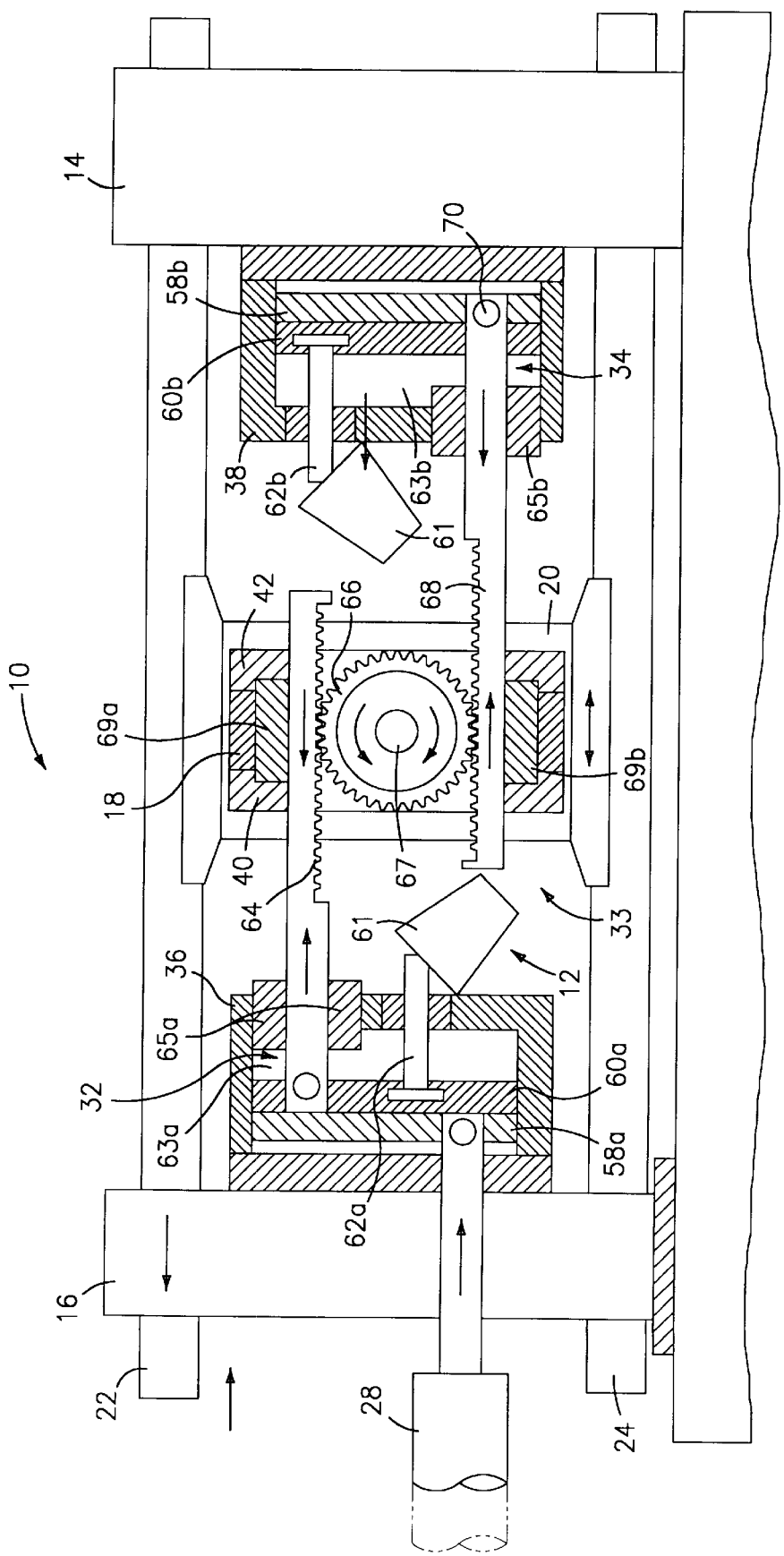
FIG. 2 is similar to FIG. 1, showing a stack mold using the same rack and pinion linkage but in conjunction with ejection plates and pins according to the principles of the present invention.
Figure 3:
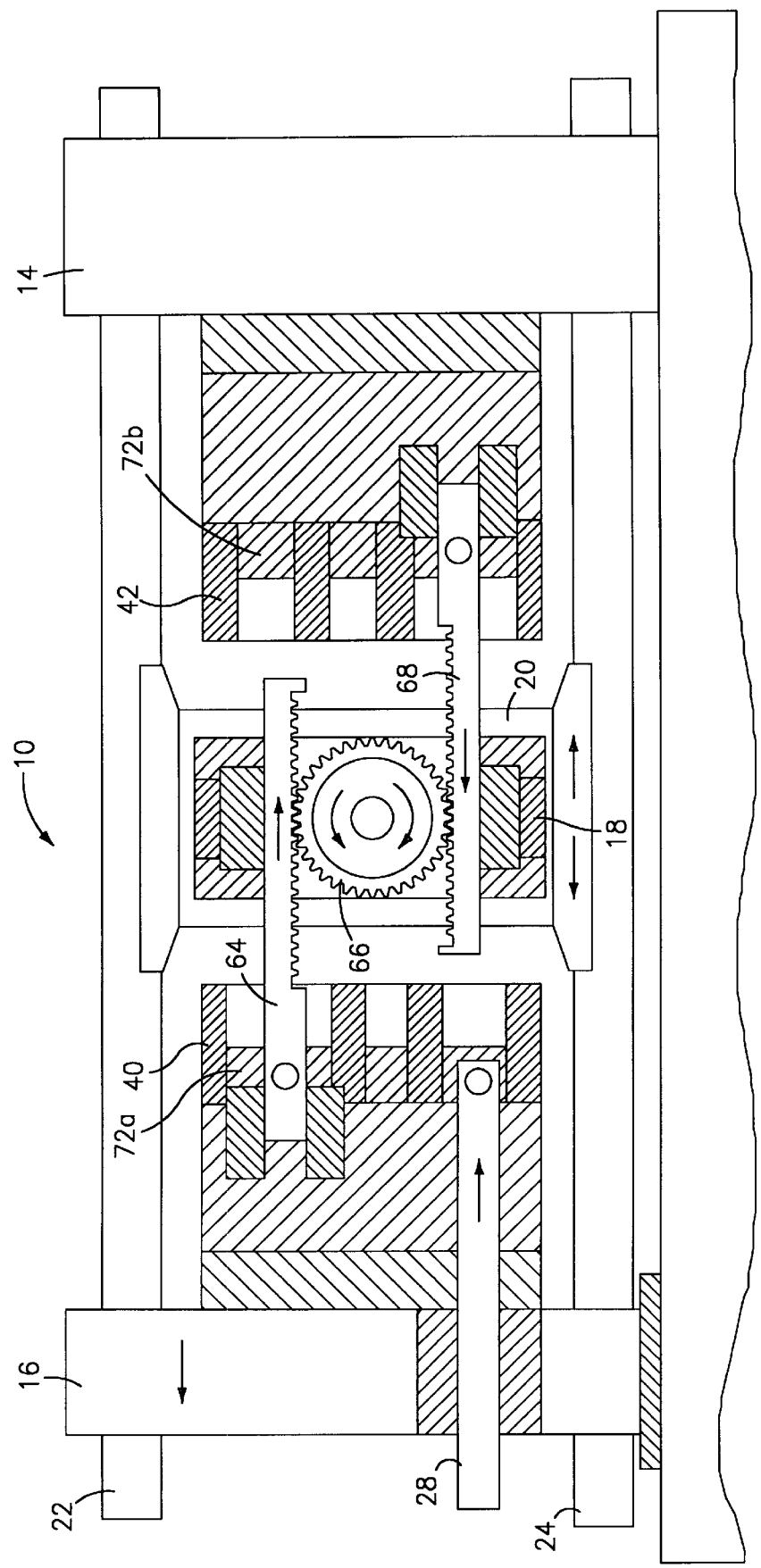
FIG. 3 is an elevational and partially cross sectional view of an injection molding machine similar to that in FIGS. 1 and 2 but which uses stripper plates linked by a central rack and pinion linkage mechanism for ejecting molded articles from the multiple mold stations thereof.

In the preferred embodiments shown in FIGS. 1–3, support member 20 allows for quick changing of the stack mold as disclosed in more detail in U.S. Pat. No. 5,578,333, Issued Nov. 26, 1996 to DiSimone et al., assigned to the assignee of the present invention. The detailed description therein with reference FIGS. 1–3 of that application is hereby incorporated by reference herein, as an embodiment of the injection molding machine.

Motive mechanism 26 for relatively moving the platens 16 and 18 with respect to fixed platen 14, is shown in the form of an offset dual rack and pinion only for the sake of simplicity in order to better illustrate the merits of the present invention. A preferred mode to implement the present invention is to use a central harmonic linkage mechanism for operating the stack mold (such as a four station mold) as shown in U.S. Pat. No. 5,578,333, Issued Nov. 26, 1996 to DiSimone et al. and U.S. patent application Ser. No. 08/440,643, filed May 15, 1995 to DiSimone et al., now U.S. Pat. No. 5,707,666, both assigned to the assignee of the present application. Motive mechanism 26 includes a first upper rack 44 and a second lower rack 46 engageable with a first rotating pinion 48 and second rotating pinion 50, respectively. Pinions 48 and 50 are rotatable on common shaft 52. First upper rack 44, in this embodiment, extends the length of machine 10 and is attached to fixed platen 14 via fasteners 54. Lower rack 46 is attached at its other end via fasteners 56 to central movable platen 18 or support member 20. Under the power of motive mechanism 26 as described, central movable platen 18 is movable over a distance L while movable platen 16 is movable over a distance 2L. The amount of distance covered by the central and movable platens is dictated by the diameters of first pinion 48 and second pinion 50, respectively, wherein the diameter of first pinion 48 is larger than the diameter of the second pinion 50. Accordingly, when movable platen 16 moves by a distance 2L, central platen 18 moves by distance L. The differential movement described is easily achieved by properly selecting the outer diameters and therefore the peripheral measurements of first and second pinions 48 and 50.

The specific design or structure of motive mechanism 26, as described above, is not critical and is but one example of a preferred embodiment. That is, ejection mechanism 12 of the present invention can be used with any type of motive mechanism used for opening and closing a stack type mold, since motive mechanism 28 of ejection mechanism 12 is independent of motive mechanism 26 for opening and closing the stack molds.

With reference now to FIG. 2, ejection mechanism 12 is described. In the FIG. 2 embodiment, movable platen 16 includes a first core plate 36 including mold cores and fixed platen 14 includes a second core plate 38 including mold cores. Central platen 18 includes first cavity plate 40 for engagement with first core plate 36 and a second cavity plate 42 for engagement with second core plate 38. Accordingly, motive mechanism 28, preferably in the form of a movable ejection rod in this embodiment, is attached to an ejecting plate 58a which abuts a retaining plate 60a located in first core plate 36 and behind the front face thereof. Motive mechanism 28 may be movable by any known means, the specific nature of which is not critical. Retaining plate 60a includes a plurality of ejection pins 62a extending therefrom and in alignment with the mold cores, not shown. Linkage 33 to be described below connects retaining plate 60a with ejection plate 58b, associated with molding station B. Accordingly, upon movement in cavity 63a under the influence of motive mechanism 28, ejecting plate 58a pushes against retaining plate 60a, moving ejection pins 62a into the mold cores and ejecting molded articles 61. Similar movement and activity occur in mold station B thereby ejecting molded articles 61 therefrom as well due to the connection of mold station B to mold station A via linkage 33.

Linkage 33 comprises an upper active rack 64 in connection with retaining ejecting plate 60a on one end and guided in sleeve 65a and in engagement with a central pinion 66 on the opposite end and guided in sleeve 69a. Central pinion 66 is rotatable on shaft 67 on central platen 18. Central pinion 66 is also in engagement with lower rack 68 which is connected to ejecting plate 58b of mold station B by fastener 70. Accordingly, upon actuation of motive mechanism 28 for moving ejecting plate 58a against retaining plate 60a, the translational movement of retaining plate 60a is transferred as a pulling force via central pinion 66 to lower rack 68, guided on sleeves 65b and 69b and attached to ejecting plate 58b. Ejecting plate 58b is thereby caused to push against retaining plate 60b, moving ejection pins 62b through the mold cores of second core plate 38. In this manner, ejection of molded articles from mold stations A and B is performed independent of motive mechanism 26 described above.

For the following alternative embodiments, which include many of the same elements already discussed in descriptions of preceding embodiments, elements which are substantially the same are given the same reference numerals in the accompanying figures, but are not further described. Accordingly, the description of these common elements described in the relevant preceding embodiments is incorporated. New elements are given new reference numbers and described in detail.

Figure 4:
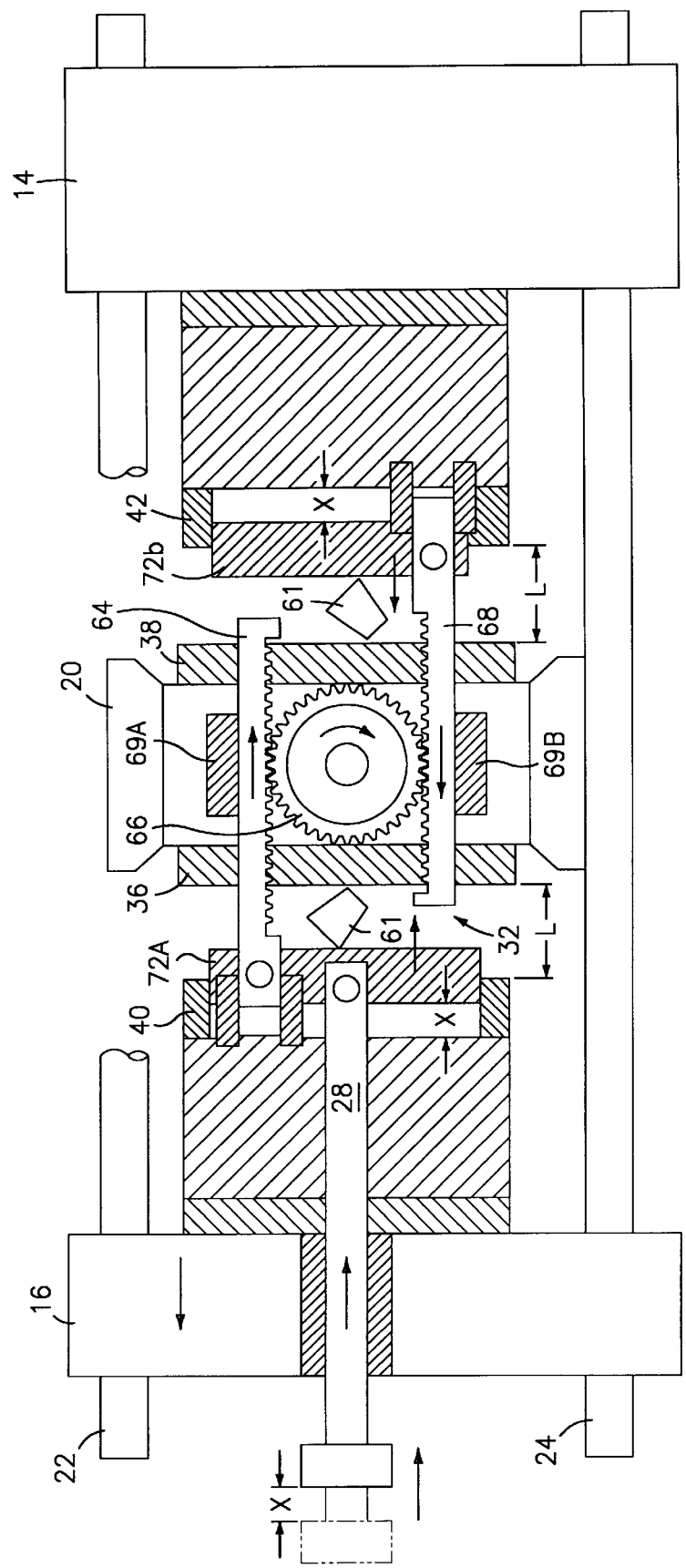
FIG. 4 shows the injection molding machine of FIG. 3, wherein the central rack and pinion linkage mechanism for ejecting molded articles has been actuated and the articles have been ejected from the molding stations via stripper plates.

As an alternative to the FIG. 2 embodiment, FIG. 3 shows an embodiment which uses stripper plates 72a and 72b in place of the ejecting pins 62a and 62b. In this embodiment, cavity plates 40 and 42 are located with movable platen 16 and fixed platen 14, respectively, instead of with central movable platen 18. Accordingly, stripper plates 72a and 72b are located inside mold cavity plates 40 and 42, respectively, for movement behind the molded parts. In this embodiment, motive mechanism 28, in the form of an ejection rod, is directly connected to stripper plate 72a. At the opposite end of stripper plate 72a, upper active rack 64 is connected to and extends off of stripper plate 72a into engagement with central pinion 66. Similar to the embodiment shown in FIG. 2, lower rack 68 also engages a central pinion and extends to and is connected with stripper plate 72b. Accordingly, upon the movement of stripper plate 72a within mold cavity plate 40 via ejection rod 28, the movement is translated via linkage 33 to stripper plate 72b for moving the same through cavity plate 42 and against molded articles therein for ejecting the same, as shown in FIG. 4.

Figures 5A, 5B:
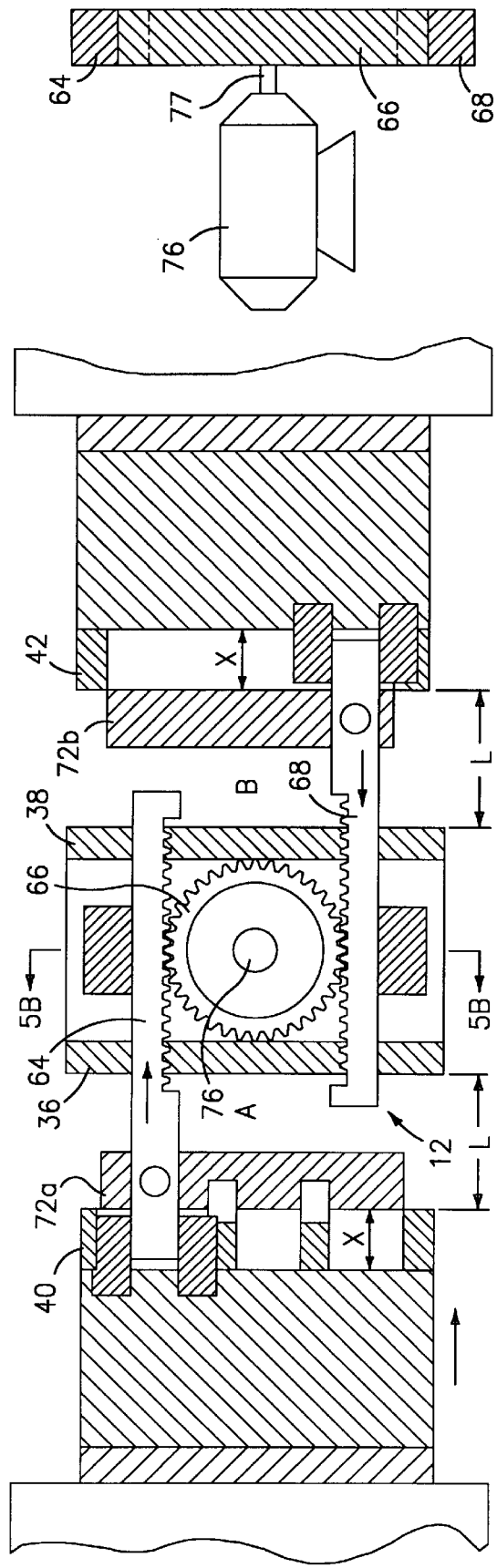
FIG. 5A is a side elevational and partially cross sectional view of another embodiment of the injection molding machine and ejection mechanism of FIG. 3, wherein a central pinion and rack linkage mechanism for use in moving the stripper plates is actuated by a motor connected to the central pinion.
FIG. 5B is a cross-sectional view of the embodiment shown in FIG. 5A taken along line 5B—5B of FIG. 5A.

Referring to FIGS. 5A and 5B, another embodiment of ejection mechanism 12 is shown wherein, in place of using ejection rod 28 for actuating upper active rack 64, an electrical servo motor 76 is positioned in connection with central pinion 66 for rotating the same in an alternating fashion for moving stripper plates 72a and 72b in mold cavity plates 40 and 42, respectively, as described above with reference to FIGS. 3 and 4. Specifically, upper active rack 64 and lower rack 68 are translated in opposite directions via pinion 66, for ejecting molded parts from mold stations A and B. Preferably, motor 76 is connected by shaft 77 to pinion 66, thereby providing independent motive means to drive ejection mechanism 12. A more balanced and rapid actuation of upper active rack 64 and lower rack 68 as well as the stripping movement of plates 72a and 72b, as discussed with reference to FIGS. 3 and 4, is achieved.

Figure 6:
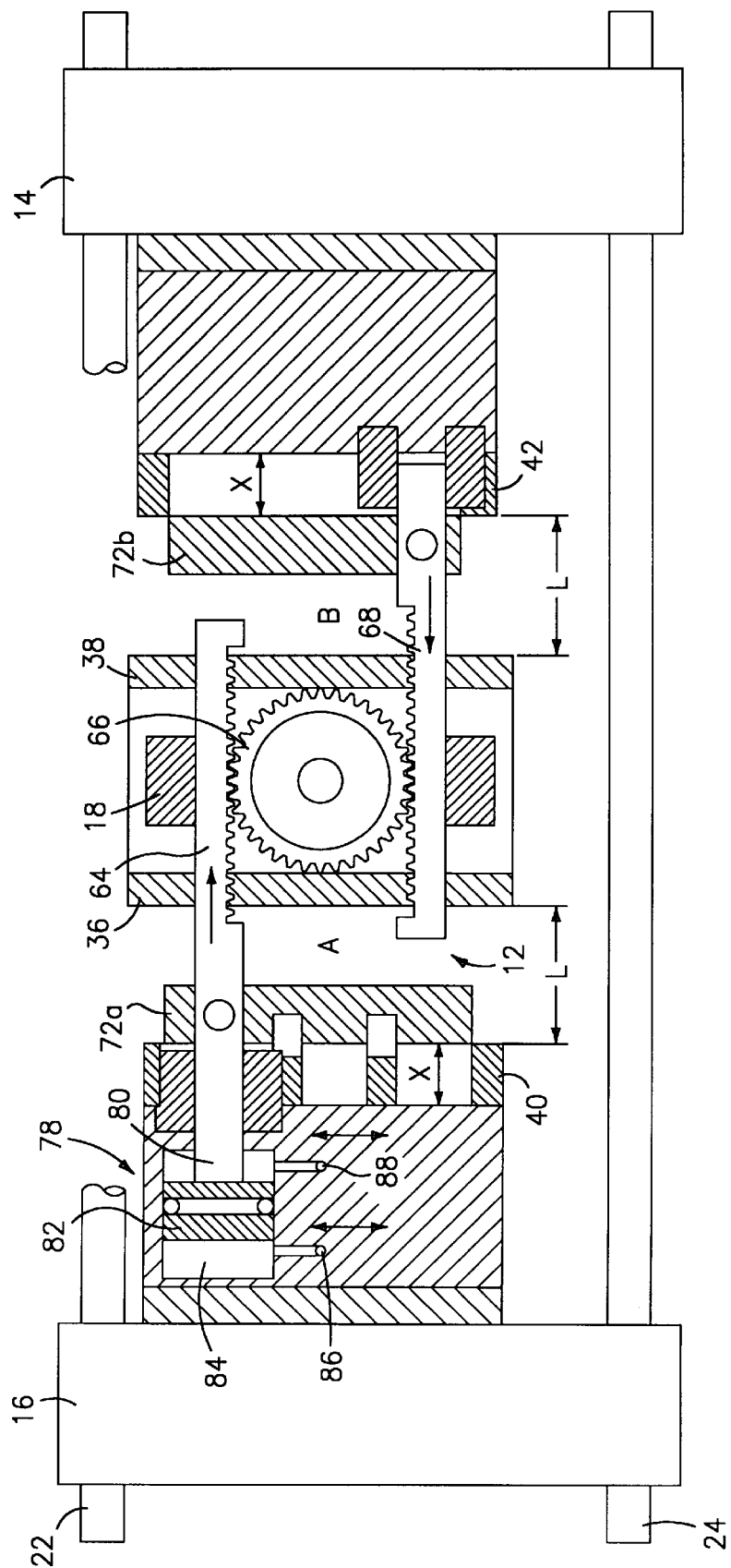
FIG. 6 is a side elevational and partially cross sectional view of another embodiment of the injection molding machine and ejection methods shown in FIG. 3, wherein the motive means for the ejection mechanism is located within the mold of one of the mold stations.

Referring now to FIG. 6, another alternative of ejection mechanism 12 is shown wherein upper active rack 64 is actuated by an independent pneumatic or hydraulic cylinder 78 located with the first mold cavity plate 40. End 80 of upper active rack 64 is connected to piston head 82 in cavity 84. Upon forcing pressurized fluid into ejection actuation input 86, ejection mechanism 12 is actuated for movement as described above with reference to FIGS. 3 and 4 and upon forcing pressurized fluid into return input 88 of cavity 84, ejection mechanism 12 returns to its unactuated state, as described above in FIGS. 3 and 4. The linkage and stripper plates also function as described above.

FIG. 7 shows an alternative embodiment of the embodiment shown in FIG. 6, wherein instead of using motive mechanism 26, as described above, for opening and closing mold stations A and B described above with reference to FIGS. 1 and 2, a harmonic linkage mechanism 90 is used which actuates upper rack 64 and lower rack 68 as shown. This linkage mechanism is described in U.S. Pat. No. 5,578,333, Issued Nov. 26, 1996 to DiSimone et al., assigned to the assignee of the present invention. The detailed description therein with reference FIGS. 1–3 of that application is hereby incorporated by reference herein, as an embodiment of the injection molding machine.

Figure 8B:
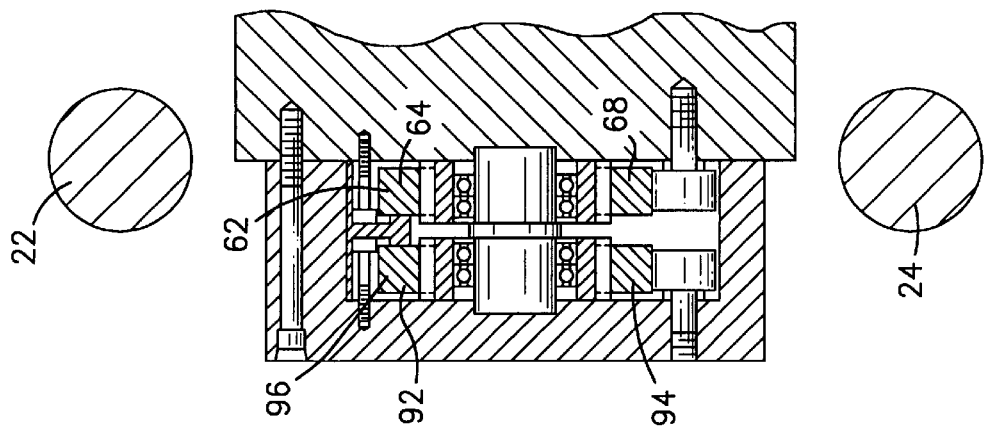
FIGS. 8A and 8B are side elevational and partially cross sectional views respectively of another embodiment of the ejecting mechanism shown in FIGS. 1–4, but wherein both the mold opening linkage and ejector plate linkage mechanisms are of the central rack and pinion type.
Figure 8A:
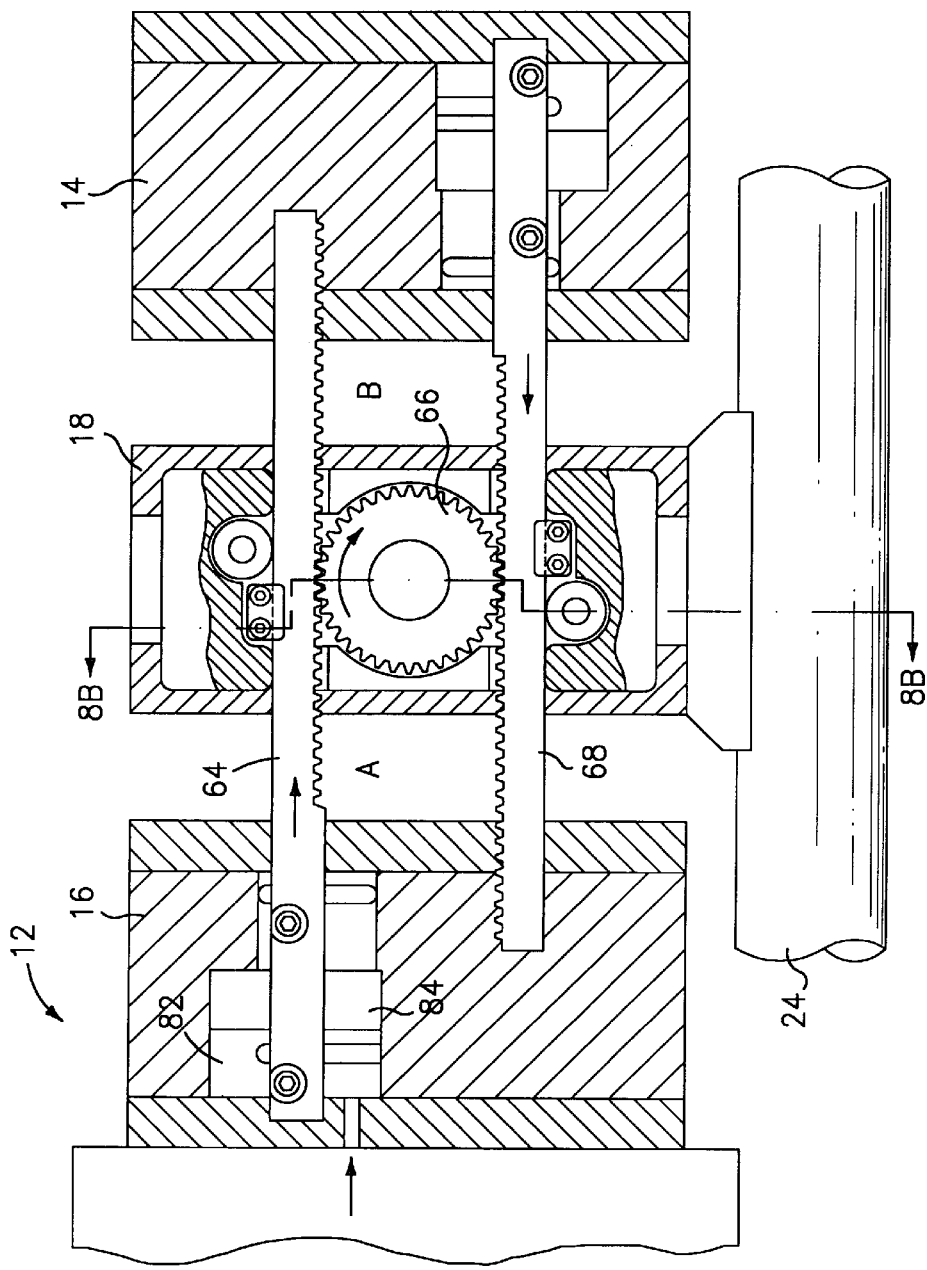
Figure 8B:
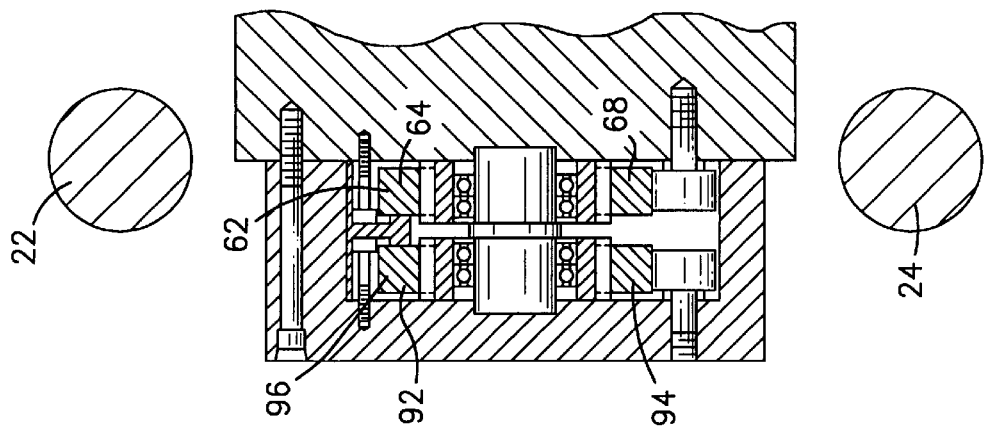
Figure 8A:
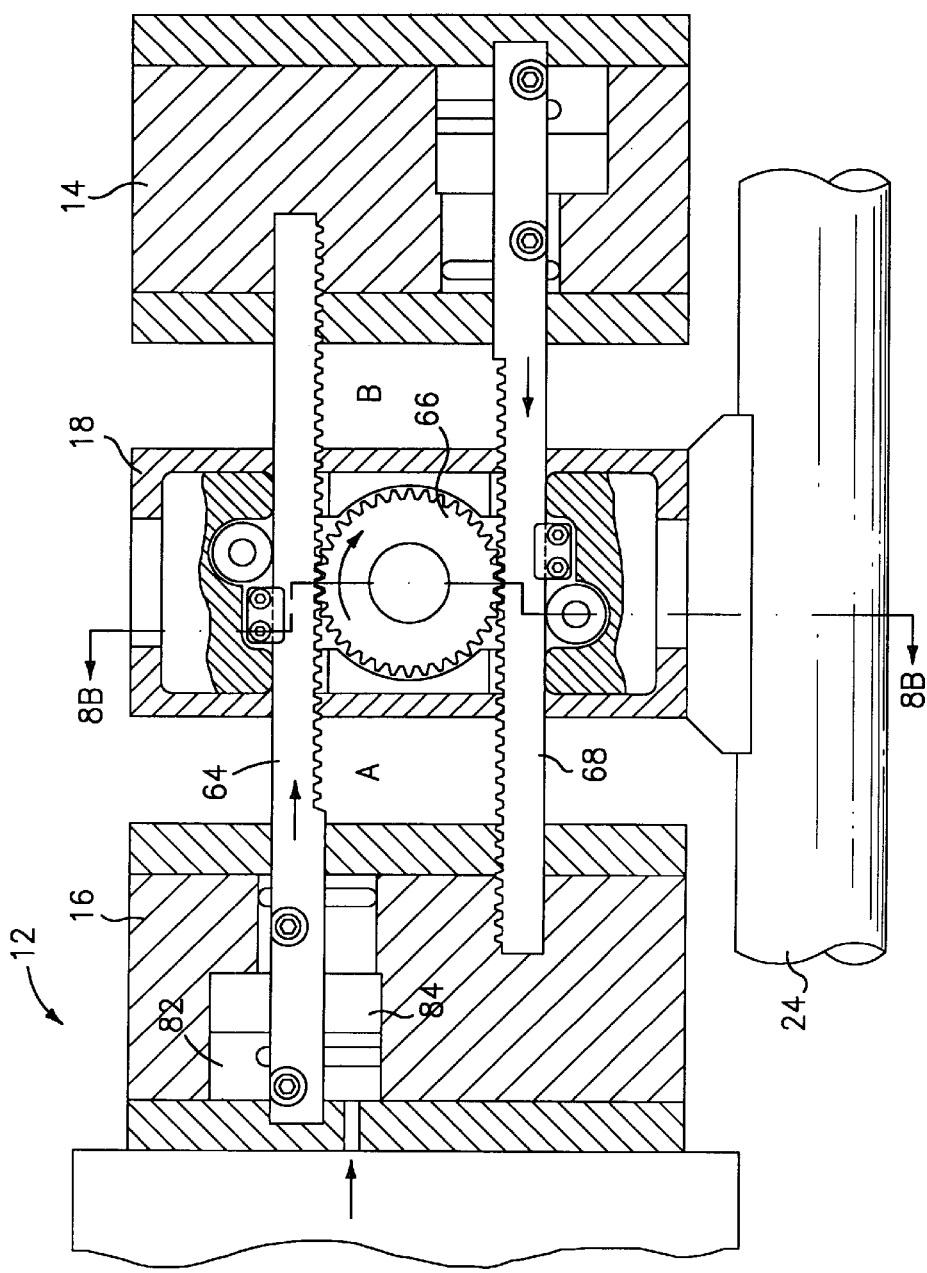

Referring now to FIGS. 8A and 8B, another alternative embodiment of the present invention is shown. In this embodiment, both motive mechanism 26 for opening and closing mold stations A and B and linkage 33 of ejection mechanism 12 are comprised of a central rack and pinion arrangement. Accordingly, ejection mechanism 12 is of the type described above for FIG. 6. As shown in FIG. 8B, a side cross sectional and elevational view of FIG. 8A, motive mechanism 26 for use in closing and opening mold stations A and B, including upper rack 92, lower rack 94, and pinion 96, is positioned centrally within central movable platen 18 and adjacent linkage 33 of ejecting mechanism 12.

Figure 9:
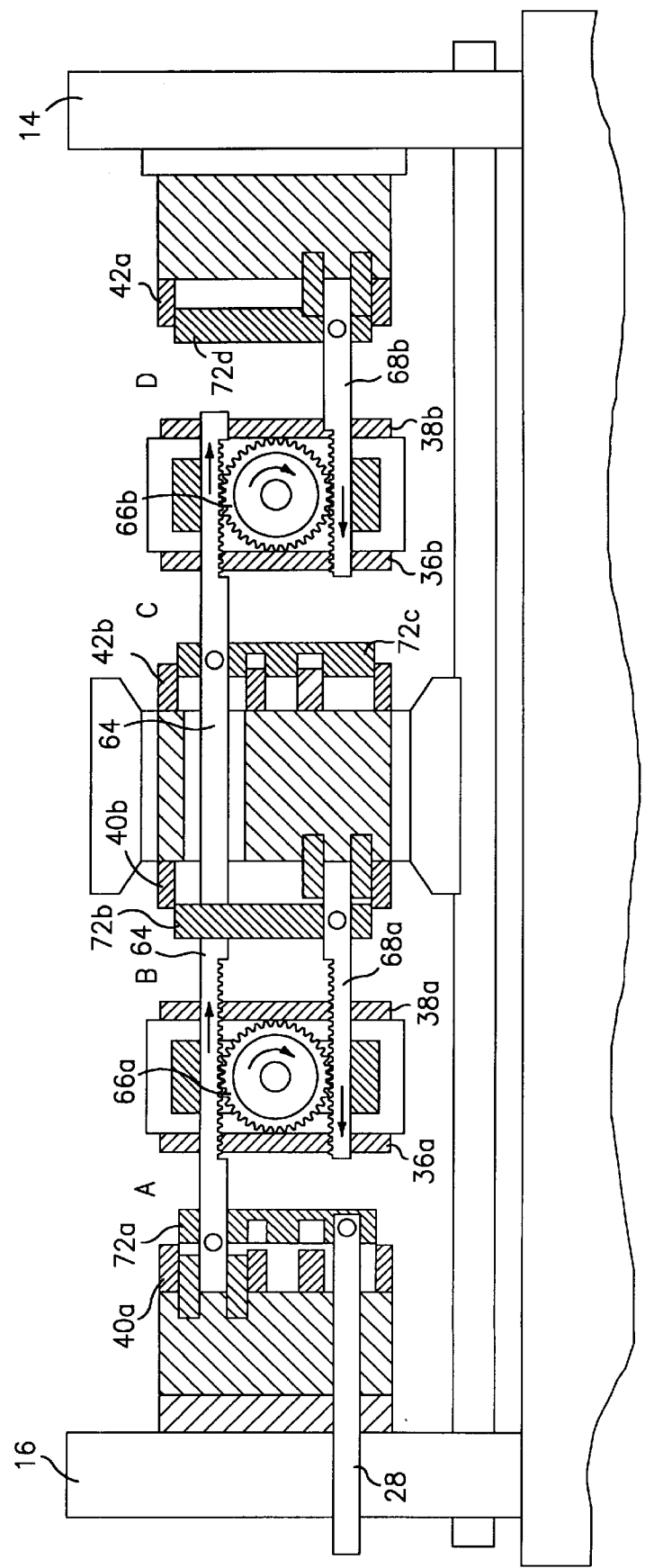
FIG. 9 is another embodiment of the injection molding machine and ejection method as described above but which is used in a four station stack mold.

FIG. 9 shows a four level stack mold having four mold stations A, B, C and D, using a variation of ejection mechanism 12, substantially as shown in FIGS. 3 and 4. The stack mold, as shown, includes movable end platen 16, including cavity plate 40a and stripper plate 72a, first movable centrally positioned platen 18a, including core plates 36a and 38a, central platen 18b, including cavity plates 40b and 42b and stripper plates 72b and 72c, second centrally positioned platen 18c including core plates 36b and 38b, and fixed end platen 14, including cavity plate 42a and stripper plate 72d. Accordingly, ejection rod 28 is used to move stripper plate 72a through plate 40a, wherein an upper active rack 64 extends from mold station A to mold station D and engages both pinions 66a and 66b along the way. Upper active rack 64 translates the actuation of stripper plate 72a to stripper plate 72b via central pinion 66a and lower rack 68a, moving stripper plate 72b through plate 40b for ejecting molded articles from station B. as described above in FIGS. 3 and 4. Along the way to engaging central pinion 66b, upper active rack 64 is also attached to stripper plate 72c for moving the same in the same manner as stripper plate 72a through plate 42b for ejecting molded articles from mold station C. Similar to as described above for FIGS. 3 and 4, upper active rack 64 further translates the actuation of stripper plates 72a and 72c to stripper plate 72d via central pinion 66b and lower rack 68b for movement through plate 42a for ejecting molded articles from station D. While only four mold stations are shown, this embodiment can be extended for use with any number of mold stations.

Figure 10:
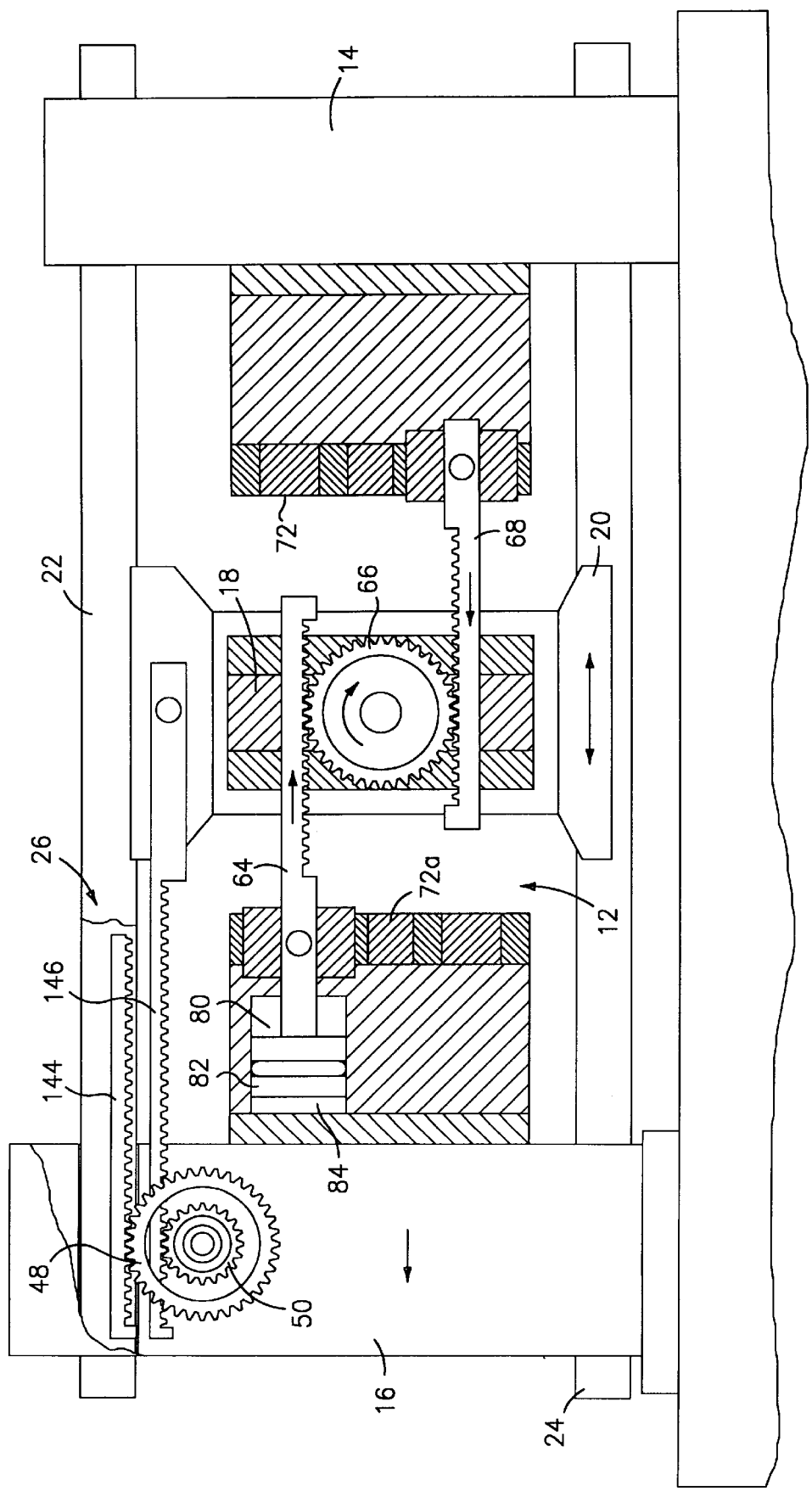
FIG. 10 is a side elevational and partially cross sectional view of a variation of the machine shown in FIG. 9, including an improved motive means for opening and closing the stations of the stack mold.

Referring now to FIG. 10, an embodiment using an ejection mechanism 12 similar to that used in FIG. 6 is shown. However, motive mechanism 26 for use in opening and closing mold stations A and B includes first upper rack 144 which is securely attached to upper tie bar 22. With this design, more reliable rotation of first pinion 48 is achieved and none or minimal vibration of upper active rack 144 occurs, thereby improving the stability of mold station opening and closing.

Figure 11:
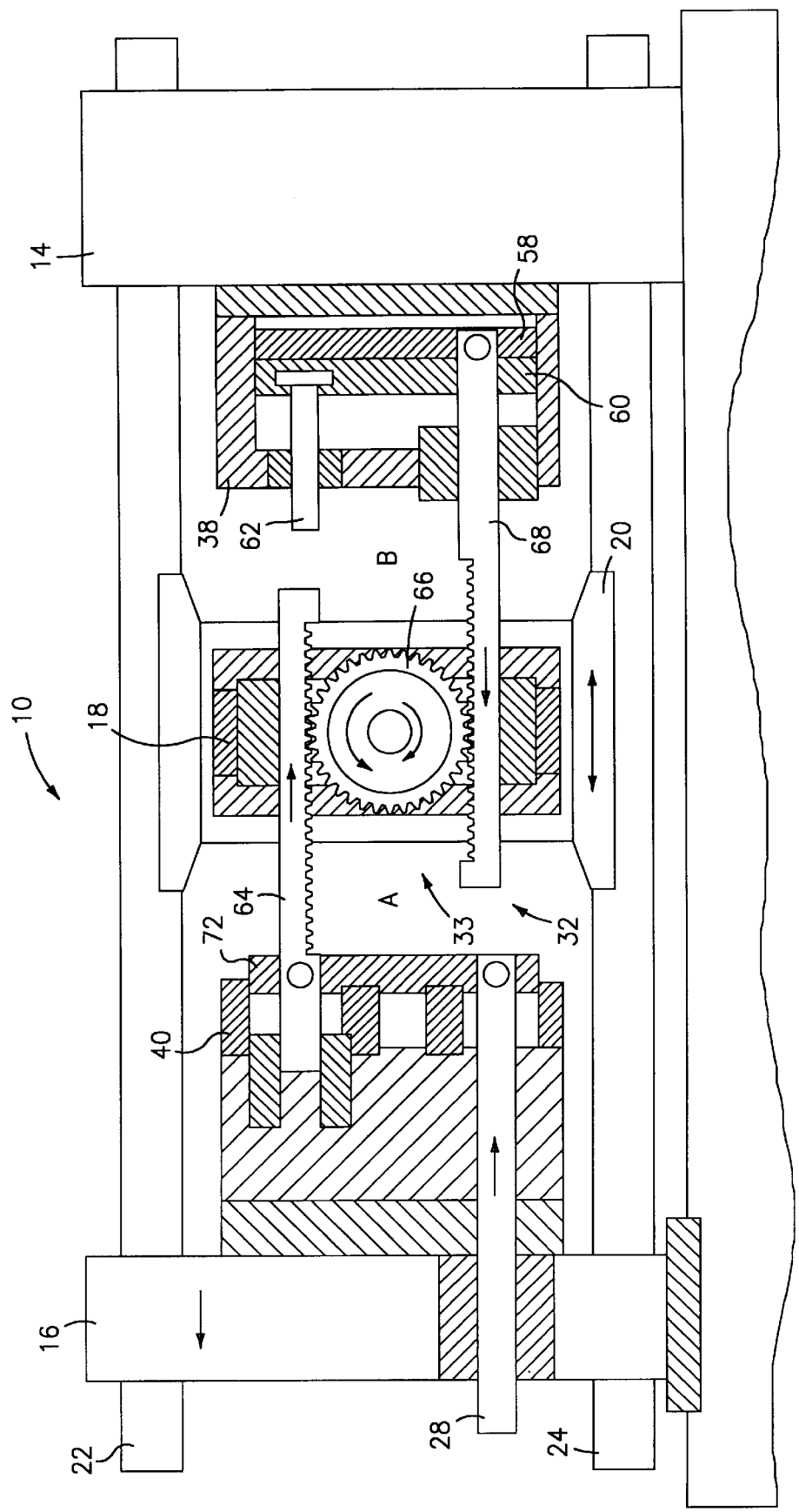
FIG. 11 is a side elevational and partially cross sectional view of a hybrid embodiment of the injection molding machine and ejecting mechanism in accordance with the principals of the present invention, wherein a stripping plate in accordance with the embodiment of FIG. 3 and ejection plates and rods in accordance with the embodiment shown in FIG. 2 are used in the two stations of the machine.

Referring now to FIG. 11, a hybrid injection molding machine is shown which uses different ejection mechanisms for each of mold stations A and B, wherein a stripper plate 72 is used for mold station A, as described above in FIGS. 3 and 4, and an ejection plate 58 is used with retaining plate 60 and ejector pins 62 in mold station B, similar to as described above in FIGS. 1 and 2. Accordingly, two different parts can be simultaneously molded and ejected using this embodiment. The linkage 33 is substantially the same as discussed above for the other embodiments.

In operation, and with reference to the figures in general, ejection mechanism 12 functions to eject molded parts from the plurality mold stations, for example, A–B and A–D, of a stack mold when the mold stations are separated via one of the motive mechanisms 26 discussed above. At the point of substantially complete separation of the mold cavity plates and mold core plates, one of stripper plates 72 and ejection plates 58 with retaining plate 60 and ejector pins 62 are actuated via motive mechanism 28. Motive mechanism 28 may be the form of an ejector rod, piston and cylinder assembly 83 or electric servo motor 76. Upon actuation of linkage 33, at least one of the stripper plates and ejector plates with pins, in the plurality of mold stations, are actuated for ejecting molded parts from the core and/or cavity plates of the multiple mold stations, independent of the motive mechanism used to open and close the mold stations.

The primary advantage of this invention is that an improved ejection means and method are provided for use with multiple station or stack molds that are simpler and more efficient than currently taught ejection methods and means used for stack molds. Another advantage of this invention is that an ejection means and method are provided including motive and/or linkage means separate from the motive and/or linkage means used to open and close the stack mold, which motive and/or linkage means are substantially universal motive and/or linkage means applicable to all mold cavity/core combinations of all mold stations of the molding machine. Still another advantage of this invention is that an improved ejection means and method are provided for ejecting articles from at least two molding stations of a stack mold, wherein ejection plates are used for each molding station and are physically linked to operate in a coordinated manner with respect to each other under a single motive means. Yet another advantage of this invention is that an improved ejection means and method are provided for ejecting molded articles from at least two stations of a stack mold, wherein the ejection of the articles from all stations of the stack mold is independent with regard to time of occurrence with respect to the opening and closing steps of the multiple molding stations of the stack mold. Still another advantage of this invention is that an improved ejection means and method are provided for ejecting articles from at least two molding stations of a stack mold, wherein ejection linkage means used for actuating the ejection of motive articles from at least two molding stations are independent of any motive and/or linkage means used for opening and closing the stack mold and/or providing operations on other machine parts. Yet another advantage of this invention is that an improved ejection means and method are provided comprising, linkage means driven by motive means positioned outside of the stack mold and unassociated with the motive means used for opening and closing the stack mold. Another advantage of this invention is that an improved ejection means and method are provided comprising linkage means driven by motive means positioned inside the stack mold, but unassociated with the motive means used for opening and closing the stack mold.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within its spirit and scope as defined by the claims.

What is claimed is:

1. An injection molding machine, comprising:
   a multistation molding means having at least a first molding station defined between a first mold platen and a second mold platen and a second molding station defined between said second mold platen and a third mold platen, means for opening and closing said molding stations, and means for connecting said first, second and third mold platens;
   ejection means for ejecting molded articles from each of said first and second molding stations;
   linkage means for connecting at least two of said ejection means and translating movement of at least one ejection means to at least one other ejection means; and
   motive means for actuating said ejection means, wherein said motive means is independent of said means for opening and closing said molding stations.

2. The machine according to claim 1, wherein said molding means is a stack mold.

3. The machine according to claim 1, including a plurality of said ejection means operational in conjunction with each of said molding stations, a first actuation means for opening and closing said molding stations, and a second actuation means for driving said ejection means.

4. The machine according to claim 3, including a first linkage means operative in conjunction with said first actuation means, and a second linkage means operative in connection with said second actuation means, wherein said second actuation means is independent of said first linkage means.

5. The machine according to claim 1, wherein said ejection means comprises a stripping plate located in one of said first and second mold platens and in one of said second and third mold platens.

6. The machine according to claim 5, wherein said stripping plate is movable through a cavity plate in one of said first and second mold platens and is movable through a cavity plate in one of said second and third mold platens.

7. The machine according to claim 1, wherein said ejection means comprises ejection pins located in one of said first and second mold platens and in one of said second and third mold platens.

8. The machine according to claim 7, wherein said ejection means further comprises an ejection plate connected with said ejection pins and said motive means, wherein upon movement of said ejection plate via said motive means, said ejection pins are moved into contact with said molded articles for ejecting said molded articles.

9. The machine according to claim 8, further comprising a retaining plate positioned between said ejection pins and said ejection plate.

10. The machine according to claim 8, wherein said motive means is connected to said ejection plate for moving said ejection plate.

11. The machine according to claim 1, wherein a first one of said ejection means is located in said first mold platen and a second one of said ejection means is located in said third mold platen, and wherein said linkage means comprises first connection means extending from said first ejection means, second connection means extending from said second ejecting means, and means for connecting said first and second connection means, wherein said means for connecting is connected to said second mold platen and translates movement of said first ejection means to said second ejection means.

12. The machine according to claim 11, wherein said means for connecting comprises a pinion and wherein each of said first and second connection means comprises a rack engageable with said pinion for achieving relative motion between said rack and said pinion.

13. The machine according to claim 1, wherein said linkage means comprises:
at least one centralized rotatable pinion;
a first rack extending from a first ejection means and movable in a first and second direction, wherein said first ejection means is positioned in said first mold platen, said first rack engaged with and adapted to rotate said pinion; and
a second rack extending from a second ejection means and movable in said first and second direction, wherein said second ejection means is positioned in said third mold platen, said second rack engaged with and adapted for translational movement by said pinion;
wherein upon movement of said first rack in one of said first and second directions during actuation of said first ejection means, said second rack is movable in a direction opposite said one of said first and second directions for actuating said second ejection means.

14. The machine according to claim 13, wherein said centralized pinion is positioned on said second mold platen.

15. The machine according to claim 1, wherein said motive means comprises a piston and cylinder mechanism, said piston connected with one of said ejection means.

16. The machine according to claim 15, wherein said piston and cylinder mechanism is positioned outside of said multistation molding means.

17. The machine according to claim 15, wherein said piston and cylinder mechanism is positioned inside said first platen.

18. The machine according to claim 1, wherein said linkage means comprises a first rack extending from a first of said ejection means, a second rack extending from a second of said ejection means in a direction opposite to that of said first rack, a centralized pinion for engagement by each of said first and second racks, wherein said motive means comprises a motor means for rotating said centralized pinion and translating said first and second racks in opposite directions for actuating said first and second ejection means.

19. The machine according to claim 1, wherein said opening and closing means comprises a first rack and pinion mechanism and wherein said linkage means comprises a second rack and pinion mechanism.

20. The machine according to claim 19, wherein each of said first and second rack and pinion mechanisms include a centralized pinion rotatably attached to said second mold platen, said first rack and pinion mechanism including a first pair of opposing racks each engaged on one end with a first centralized pinion and each connected on an opposite end with one of said first and third mold platens, and wherein said second rack and pinion mechanism includes a second pair of opposing racks each engaged on one end with a second centralized pinion and each connected on an opposite end with one of said ejection means.

21. The machine according to claim 20, wherein said first and second rack and pinion mechanisms are positioned adjacent to each other.

22. The machine according to claim 1, wherein said multistation molding means includes at least four molding stations, said stations defined between an end movable mold platen and a first centrally positioned movable mold platen, between said first centrally positioned movable mold platen and a central movable mold platen, between said central movable mold platen and a second centrally positioned movable mold platen, and between said second centrally positioned mold platen and a stationary mold platen, said linkage means comprising:
at least a first and a second rotatable pinion;
a first rack pair extending between and connected to a first one of said ejection means of said movable end mold platen and a second one of said ejection means of said central movable mold platen; and
a second rack pair extending between and connected to a third one of said ejection means of said central movable mold platen and a fourth one of said ejection means of said stationary mold platen;
wherein said first pinion is connected to and rotatable on said first centrally positioned mold platen and racks comprising said first rack pair engage said first pinion, and wherein said second pinion is connected to and rotatable on said second centrally positioned mold platen and racks comprising said second rack pair engage said second pinion.

23. The machine according to claim 22, wherein said first and second rack pairs share a common rack.

24. The machine according to claim 23, wherein said common rack is connected with said first and third ejection means.

25. The machine according to claim 22, wherein each of said movable end mold platen, said central movable mold platen and said stationary mold platen include cavity plates, and wherein said first, second, third and fourth ejection means comprise stripper plates positioned in each of said cavity plates, said stripper plates actuated via said rack pairs.

26. The machine according to claim 1, wherein said opening and closing means comprises a rack and pinion assembly extending between at least two of said first, second and third mold platens, and wherein said motive means comprises a piston and cylinder mechanism positioned inside said first mold platen.

27. The machine according to claim 26, wherein said rack and pinion assembly comprises a first rack and a second rack and a first outer rotatable pinion and a second inner rotatable pinion concentric to said first outer rotatable pinion, said first and second pinions connected with and rotatable on said first mold platen, wherein said first rack is secured to said means for connecting and said second rack is secured to said second mold platen and extends between said first and second mold platens, said first rack engageable with said first outer pinion and said second rack engageable with said second inner pinion.

28. The machine according to claim 27, wherein said means for connecting comprise tie bars.

29. The machine according to claim 28, wherein said first rack comprises an upper rack secured to an upper one of said tie bars and said second rack comprises a lower rack connected to said second mold platen and engaged with said second rotatable pinion.

30. The machine according to claim 1, wherein said ejection means includes first and second ejection means, said first and second ejection means comprising different devices for use in ejecting different molded articles.

31. The machine according to claim 30, wherein said first mold platen is a movable end mold platen and includes said first ejection means, said first ejection means comprising one of a stripping plate and an ejection pin, and wherein said third mold platen is a stationary mold platen and includes said second ejection means, said second ejection means comprising a stripping plate if said first ejection means comprises an ejection pin and said second ejection means comprising an ejection pin if said first ejection means comprises a stripper plate.

32. The machine according to claim 31, wherein said linkage means comprises first connection means extending from said first ejection means, second connection means extending from said second ejecting means, and means for connecting said first and second connection means, wherein said means for connecting is connected to said second mold platen and translates motion of said first ejection means to said second ejection means.

33. The machine according to claim 32, wherein said means for connecting comprises a pinion and wherein each of said first and second connection means comprises a rack.

34. The machine according to claim 31, wherein said linkage means comprises:

at least one centralized rotatable pinion;

a first rack extending from said first ejection means and movable in a first and second direction, said first rack engaged with and adapted to rotate said pinion; and a second rack extending from said second ejection means and movable in said first and second direction, said second rack engaged with and adapted for translational movement by said pinion;

wherein upon movement of said first rack in one of said first and second direction during actuation of said first ejection means, said second rack is movable in a direction opposite said one of said first and second directions for actuating said second ejection means.

* * * * *